(12) United States Patent
Kanai et al.

(10) Patent No.: US 8,049,851 B2
(45) Date of Patent: Nov. 1, 2011

(54) METHOD FOR MANUFACTURING A LIQUID CRYSTAL DISPLAY DEVICE HAVING A SECOND ORIENTATION FILM SURROUNDING A FIRST ORIENTATION FILM

(75) Inventors: Masahide Kanai, Kanagawa (JP); Takeshi Nishi, Kanagawa (JP); Daisuke Kubota, Kanagawa (JP); Tetsuji Ishitani, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 181 days.

(21) Appl. No.: 12/143,032

(22) Filed: Jun. 20, 2008

(65) Prior Publication Data
US 2009/0002619 A1 Jan. 1, 2009

(30) Foreign Application Priority Data
Jun. 26, 2007 (JP) ................. 2007-167346

(51) Int. Cl.
*G02F 1/1337* (2006.01)
*G02F 1/13* (2006.01)
(52) U.S. Cl. ...................... 349/129; 349/187
(58) Field of Classification Search ............. 349/129
See application file for complete search history.

(56) References Cited

U.S. PATENT DOCUMENTS

| | | |
|---|---|---|
| 3,892,471 A | 7/1975 | Biermann et al. |
| 4,325,610 A | 4/1982 | Inoue |
| 4,409,268 A | 10/1983 | Inoue et al. |
| 4,470,667 A | 9/1984 | Okubo et al. |
| 4,482,213 A | 11/1984 | Piliavin et al. |
| 4,691,995 A | 9/1987 | Yamazaki et al. |
| 4,705,345 A | 11/1987 | Ayliffe et al. |
| 4,773,737 A | 9/1988 | Yokono et al. |
| 5,550,091 A | 8/1996 | Fukuda et al. |

(Continued)

FOREIGN PATENT DOCUMENTS

JP 47-018298 9/1972

(Continued)

OTHER PUBLICATIONS

Lakatos, "Active Matrix Addressing", SID Digest '84: SID International Symposium Digest of Technical Papers, Jun. 1, 1984, pp. 74-75.

*Primary Examiner* — Mark A Robinson
*Assistant Examiner* — Paul C Lee
(74) *Attorney, Agent, or Firm* — Nixon Peabody LLP; Jeffrey L. Costellia

(57) ABSTRACT

A liquid crystal dripping method has a problem in that an uncured sealant increases in width at the time of attaching a pair of substrates and thus a liquid crystal material enters the sealant and unevenness occurs in the inner periphery of the sealant. A region in which reduced is the speed of diffusion of liquid crystal at the time of attaching a pair of substrates is provided between a sealant and an orientation film. Further, time for diffusing the liquid crystal and coming in contact with the sealant is made long. Accordingly, the sealant is subjected to photo-curing before the liquid crystal comes in contact with the sealant. The region in which reduced is the speed of diffusion of the liquid crystal is formed using a material for forming a vertical orientation film, a silane coupling agent, a substance having a photocatalytic function, or the like.

11 Claims, 7 Drawing Sheets

U.S. PATENT DOCUMENTS

| | | |
|---|---|---|
| 5,796,458 A | 8/1998 | Koike et al. |
| 5,929,961 A | 7/1999 | Nishi et al. |
| 6,055,035 A | 4/2000 | von Gutfeld et al. |
| 6,226,067 B1 | 5/2001 | Nishiguchi et al. |
| 6,277,529 B1 | 8/2001 | Marumoto et al. |
| 6,320,640 B2 | 11/2001 | Nishi et al. |
| 6,331,884 B1 | 12/2001 | Masazumi et al. |
| 6,476,899 B2 | 11/2002 | Ishida et al. |
| 6,573,972 B2 | 6/2003 | Sasaki |
| 6,638,781 B1 | 10/2003 | Hirakata et al. |
| 6,639,647 B1 | 10/2003 | Inou |
| 6,671,030 B2 | 12/2003 | Goyoda |
| 6,705,584 B2 | 3/2004 | Hiroshima et al. |
| 6,831,725 B2 | 12/2004 | Niiya |
| 6,839,123 B2 | 1/2005 | Nishi et al. |
| 6,850,309 B2 | 2/2005 | Inoue et al. |
| 6,851,460 B2 | 2/2005 | Tamai |
| 6,952,020 B1 | 10/2005 | Yamazaki et al. |
| 7,075,106 B2 | 7/2006 | Shibata et al. |
| 7,362,409 B2 | 4/2008 | Tamatani et al. |
| 7,609,358 B2 | 10/2009 | Yamazaki et al. |
| 2001/0048499 A1* | 12/2001 | Numano et al. ............... 349/123 |
| 2002/0027636 A1 | 3/2002 | Yamada |
| 2003/0043338 A1 | 3/2003 | Liou et al. |
| 2004/0233374 A1* | 11/2004 | Yamazaki et al. ............ 349/153 |
| 2005/0105039 A1 | 5/2005 | Nishi et al. |
| 2005/0134787 A1 | 6/2005 | Kim |
| 2005/0206829 A1* | 9/2005 | Hashimoto et al. ........... 349/153 |
| 2006/0227270 A1* | 10/2006 | Ahn et al. ..................... 349/129 |

FOREIGN PATENT DOCUMENTS

| | | |
|---|---|---|
| JP | 49-126350 | 12/1974 |
| JP | 50-015495 | 5/1975 |
| JP | 51-065656 | 6/1976 |
| JP | 53-091763 | 8/1978 |
| JP | 57-124827 | 8/1982 |
| JP | 59-057221 | 4/1984 |
| JP | 59-171925 | 9/1984 |
| JP | 59-195222 | 11/1984 |
| JP | 60-021028 | 2/1985 |
| JP | 60-075817 | 4/1985 |
| JP | 60-111221 | 6/1985 |
| JP | 60-126624 | 7/1985 |
| JP | 61-190313 | 8/1986 |
| JP | 62-015520 | 1/1987 |
| JP | 62-251723 | 11/1987 |
| JP | 11-038424 | 2/1999 |
| JP | 11-109388 | 4/1999 |
| JP | 2000-284295 | 10/2000 |
| JP | 2002-214626 | 7/2002 |
| JP | 2002-350873 | 12/2002 |

* cited by examiner

METHOD FOR MANUFACTURING A LIQUID CRYSTAL DISPLAY DEVICE HAVING A SECOND ORIENTATION FILM SURROUNDING A FIRST ORIENTATION FILM

BACKGROUND OF THE INVENTION

1. Field of the Invention

The present invention relates to a liquid crystal display device and a method for manufacturing the liquid crystal display device. For example, the present invention relates to an electro-optical device typified by a liquid crystal display panel having a circuit including a thin film transistor (hereinafter, a TFT) and a method for manufacturing the electro-optical device, and a method for manufacturing an electronic device provided with such an electro-optical device as a component.

2. Description of the Related Art

In recent years, attention has focused on a technique for forming a thin film transistor (TFT) by using a semiconductor thin film (having a thickness of approximately several nanometers to several hundreds of nanometers) formed over a substrate having an insulating surface. Thin film transistors are widely applied to electronic devices such as ICs and electro-optical devices, and in particular, their rapid development as switching elements for image display devices is desired.

A liquid crystal display device is known as an example of the image display devices. Compared to passive matrix liquid crystal display devices, high-definition images can be obtained with active matrix liquid crystal display devices; therefore, the active matrix liquid crystal display devices have become widely used. In the active matrix liquid crystal display devices, when pixel electrodes arranged in matrix are driven, a display pattern is formed on a screen. In more detail, when voltage is applied between a selected pixel electrode and a counter electrode that corresponds to the selected pixel electrode, a liquid crystal layer provided between the pixel electrode and the counter electrode is optically modulated, and this optical modulation is recognized as a display pattern by a viewer.

The application range of such active matrix electro-optical devices is expanding, and demands for high definition, a higher aperture ratio, and high reliability are increasing as a screen size gets larger. At the same time, demands for improvement in productivity and cost reduction are increasing.

The cost for materials is increased as the size of the panel gets larger. In particular, a liquid crystal material provided between a pixel electrode and a counter electrode is expensive.

In the case of using a liquid crystal injection method, sealing of liquid crystal requires a complex process such as drawing of a sealant, attachment of a counter substrate, division of substrates, injection of liquid crystal, and sealing of an inlet for injecting liquid crystal. In particular, as a panel size gets larger, it becomes difficult to fill a region surrounded by the sealant (including at least a pixel portion) with liquid crystal since liquid crystal is injected using a capillary phenomenon. When liquid crystal is injected using a capillary phenomenon, a larger amount of liquid crystal than that to be injected from the liquid crystal inlet is used in vain.

Further, when a liquid crystal injection method is used, two substrates are attached to each other and divided, and then, a liquid crystal material is injected from a liquid crystal inlet formed on the divided surface. At this time, a path of the liquid crystal material extending from the liquid crystal inlet to a pixel region is also filled with the liquid crystal. Further, when a driver circuit portion and a pixel portion are provided over one substrate, not only the pixel portion but also a region overlapping with the driver circuit portion is filled with the liquid crystal in some cases. In such a manner, a region except the region to be a display portion is also filled with the liquid crystal material.

In addition, an extremely large amount of liquid crystal flows in the path of the liquid crystal material extending from the liquid crystal inlet to the pixel region especially around the liquid crystal inlet, compared to other portions in the panel. Therefore, there is a concern that around the inlet, the surface of an orientation film is changed due to friction caused by injecting the liquid crystal, and orientation of liquid crystal molecules is disordered as a result.

Further, in a liquid crystal injection method, a step of sealing the liquid crystal inlet is necessary after the liquid crystal injection.

The present applicant propose a technique of attaching a pair of substrates to each other under reduced pressure after dripping liquid crystal, in Reference 1 (U.S. Pat. No. 4,691,995).

SUMMARY OF THE INVENTION

The technique disclosed in Reference 1 is called a liquid crystal dripping method (ODF: one drop fill). A liquid crystal dripping method can eliminate the loss of materials because only a necessary amount of liquid crystal is dripped to a necessary portion. Since a seal pattern has a closed loop shape, a seal pattern for a liquid crystal inlet and a path is not necessary. Accordingly, defects caused at the time of liquid crystal injection (such as defective orientation) is eliminated.

A liquid crystal dripping method is greatly different from a liquid crystal injection method in the order of steps.

Manufacturing steps of a liquid crystal display device using a liquid crystal injection method will be described. First, a sealant is drawn on a counter substrate by a screen printing method or using a dispenser apparatus. Next, the counter substrate is attached to another substrate, and the both substrates are bonded to each other by curing the sealant with heat press. Then, the pair of substrates is divided so that part of the sealant (a liquid crystal inlet) is positioned at the edge of the substrate. After that, the pair of substrates are disposed in a chamber under reduced pressure, the pressure in the chamber is made to return gradually from the reduced pressure to the atmospheric pressure with a liquid crystal material being in contact with the liquid crystal inlet, so that the liquid crystal material is injected from the liquid crystal inlet using a capillary phenomenon. The liquid crystal inlet is sealed with a sealing material, and the sealing material is cured by being irradiated with ultraviolet light. Finally, heat treatment is performed to align the liquid crystal molecules.

Manufacturing steps of a liquid crystal display device using a liquid crystal dripping method will be described. First, a sealant having a closed pattern is drawn on a counter substrate using a dispenser apparatus. Next, only a desired amount of liquid crystal is dripped to a region surrounded by the sealant of the counter substrate. The counter substrate is attached to another substrate under reduced pressure. An atmosphere around the pair of substrates is changed from the reduced pressure to the atmospheric pressure. The sealant is cured by being irradiated with ultraviolet light. Then, heat treatment for further curing the sealant and heat treatment for aligning the liquid crystal molecules are performed at the same time. Finally, the pair of substrates is divided.

In a liquid crystal injection method, the pair of substrates are bonded to each other by heat press and divided, and then, the liquid crystal is injected. In a liquid crystal dripping method, the liquid crystal is dripped to the substrate, and then, the pair of substrates is attached to each other under reduced pressure and divided.

It is necessary to perform heat treatment to align the liquid crystal molecules. In a liquid crystal injection method, heat treatment is performed to align the liquid crystal molecules after curing the sealing material. In a liquid crystal dripping method, heat treatment for curing the sealant and heat treatment for aligning the liquid crystal molecules are performed at the same time, whereby a liquid crystal display device is efficiently manufactured.

In a liquid crystal injection method, the sealant which is cured by heat press and the liquid crystal are in contact with each other, while in a liquid crystal dripping method, the sealant which is not cured and the liquid crystal are in contact with each other.

In a liquid crystal dripping method, the sealant which is not cured increases in width at the time of attaching the pair of substrates, and the liquid crystal is spread from a portion at which liquid crystal is dripped.

As a result, a problem occurs in that the liquid crystal material enters the sealant and unevenness occurs in the inner periphery of the sealant. The unevenness caused in the inner periphery of the sealant may lead poor display.

It is an object of the present invention to provide a panel structure in which unevenness does not occur in the inner periphery of a sealant by contact between liquid crystal and the sealant which is not cured at the time of attaching a pair of substrates, and a method for manufacturing the panel.

Thus, in the present invention, a region in which reduced is the speed of diffusion of liquid crystal at the time of attaching a pair of substrates is provided between a sealant and an orientation film. Further, time for diffusing the liquid crystal and coming in contact with the sealant is made long. Accordingly, the sealant is cured before the liquid crystal comes in contact with the sealant. Note that it is not necessary that sealant be cured before the liquid crystal comes in contact with the sealant. Even when the sealant is cured in the state where the liquid crystal partly comes in contact with the sealant, unevenness can be prevented in the inner periphery of the sealant. Further, an impurity can be prevented from seeping into the liquid crystal from the sealant which is not cured.

Further, it is preferable to subject the sealant to photo-curing by irradiation with ultraviolet before the liquid crystal is spread and comes in contact with the sealant through attachment of a pair of substrates to each other.

For the sealant, an ultraviolet curable resin which is curable in a short time is preferably used. Further, for the sealant, a resin which is cured by both ultraviolet irradiation and heating may be used. Furthermore, in the case of the sealant having a low viscosity, an inkjet method is suitable in dripping the sealant, and in the case of the sealant having a high viscosity, a dispensing method is suitable in dripping the sealant.

The region in which reduced is the speed of diffusion of the liquid crystal is formed using a material for forming a vertical orientation film, a silane coupling agent, a substance having a photocatalytic function, or the like.

As a structure of the present invention which relates to a manufacturing method which is disclosed in this specification, a method for manufacturing a liquid crystal display device includes the steps of forming a first orientation film over a first substrate, forming a second orientation film surrounding the first orientation film over the first substrate, forming a sealant surrounding the first orientation film and the second orientation film over the first substrate, dripping liquid crystal to the first orientation film, and partly overlapping the sealant with the second orientation film with the width of the sealant increased and subjecting at least part of the sealant to photo-curing while the first substrate and the second substrate are attached to each other under reduced pressure. It is to be noted that the second orientation film is a vertical orientation film, which is different from the first orientation film.

The liquid crystal display device obtained by the above-described method has a feature, and as a structure thereof, a liquid crystal display device includes a first substrate, a second substrate facing the first substrate, liquid crystal between the first substrate and the second substrate, a first orientation region, a second orientation region surrounding the first orientation region, and a sealant surrounding the first orientation region and the second orientation region, where the amount of light passing through the first orientation region is controlled in each pixel to display an image. In the liquid crystal display device, a vertical orientation film is selectively formed over part of a surface of the first substrate which overlaps with the second orientation region or on part of a surface of the second substrate which overlaps with the second orientation region, and the vertical orientation film and the sealant partly overlap.

In the above-described structure, the amount of light passing through the first orientation region is controlled in each pixel to display an image. Therefore, an orientation region of liquid crystal which is different from a displaying region is formed using the second orientation film surrounding the displaying region, whereby leakage of light can be reduced. Further, in order to reduce leakage of light, it is desirable that there be no space between the first orientation film and the second orientation film. Thus, the first orientation film and the second orientation film are formed to be in contact with each other, and preferably, the second orientation film is partly formed over a terminal portion of the first orientation film.

There is no particular limitation on the liquid crystal material, and TN liquid crystal, OCB liquid crystal, STN liquid crystal, VA liquid crystal, ECB liquid crystal, GH liquid crystal, polymer dispersed liquid crystal, discotic liquid crystal, or the like can be used.

In the above description, the second orientation film is made different from the first orientation film, and a vertical orientation film is used as the second orientation film. However, alternatively, a vertical orientation film may be used as the first orientation film and an orientation film which is different from the vertical orientation film may be used as the second orientation film, whereby a normally black liquid crystal panel, such as a transmissive liquid crystal display device employing a vertical alignment (VA) mode can be obtained. Some examples are given as a vertical alignment mode. For example, an MVA (multi-domain vertical alignment) mode, a PVA (patterned vertical alignment) mode, an ASV mode, or the like can be employed. Specifically, one pixel is divided into a plurality of sub pixels and a projection is provided in a position of a counter substrate corresponding to the center of each sub pixel, so that a multi-domain pixel is formed. It is to be noted that the projection may be provided over/on either one or both of the counter substrate and the element substrate. The projection makes liquid crystal molecules orient radially and improves controllability of the orientation. An MVA mode provides a plurality of different orientation states in a pixel portion. Therefore, in the case of applying the present invention, an orientation state which is further different is provided outside the pixel portion.

As another structure of the present invention which relates to a manufacturing method, a method for manufacturing a liquid crystal display device includes the steps of forming an orientation film over the first substrate, subjecting the orientation film to rubbing treatment, forming a coating portion by dripping a liquid repellent treatment agent so as to surround the orientation film, forming a sealant surrounding the coating portion over the first substrate, dripping liquid crystal to a region surrounded by the coating portion, and aligning the inner periphery of the sealant with the outer periphery of the coating portion with the width of the sealant increased and subjecting at least part of the sealant to photo-curing while the first substrate and the second substrate are attached to each other under reduced pressure.

The liquid crystal display device obtained by the above-described method has a feature, and as a structure thereof, a liquid crystal display device includes a first substrate, a second substrate facing the first substrate, liquid crystal between the first substrate and the second substrate, a sealant surrounding the liquid crystal, and a coating portion obtained by dripping a liquid repellent treatment agent to either one or both of the first substrate and the second substrate, where the coating portion has a frame-like shape, and the outer periphery of the coating portion is disposed along the inner periphery of the sealant. It is to be noted that the liquid repellent treatment agent is a silane coupling agent.

In this specification, the silane coupling agent is a silicon-based compound including a site which can be bound with (chemically adsorbed to) a substrate (for example, an alkoxy group which hydrolyzes and provides a silanol group (such as a trialkoxysilane-based compound) or a halogen atom (such as a trihalosilane-based compound)) and a site having vertical alignment with respect to liquid crystal molecules (for example, an alkyl group having 10 to 22 carbon atoms, a fluoroalkyl group, or the like). Therefore, it can be said that the silane coupling agent is also one kind of materials for forming a vertical orientation film. In this specification, a film formed using a silane coupling agent is a self-assembled monolayer. Since the film is extremely thin, the film is named in distinction from the vertical orientation film such as a resin film. The coating portion to which a silane coupling agent is applied has low adhesion with the sealant. Therefore, it is preferable that the coating portion do not overlap with the sealant even when the sealant is increased in width at the time of attachment, and the outer periphery of the coating portion is disposed along the inner periphery of the sealant.

As a specific example of the silane coupling agent, octadecyltrimethoxysilane (also referred to as ODS), octadecyltrichlorosilane (also referred to as OTS), N,N-dimethyl-N-octadecyl-3-aminopropyl trimethoxysilyl chloride (also referred to as DMOAP), and the like can be given. However, the silane coupling agent is not limited thereto.

In addition, the silane coupling agent forms a self-assembled monolayer through reactions such as hydrolysis and condensation. Therefore, a solvent such as water, alcohol, or ketone may be added in order to promote hydrolysis; however, the silane coupling agent is hydrolyzed enough with atmospheric moisture or the like. In addition, it is possible that a liquid crystal material is mixed with water, alcohol, ketone, or the like due to temporal exposure to the atmosphere in a liquid crystal synthesis process or in a normal manufacturing step of a liquid crystal display device. Such content is a sufficient amount to complete the reactions such as hydrolysis and condensation; thus, it is not necessarily needed to intentionally add the solvent. In the case of intentionally adding water, alcohol, ketone, or the like, the content thereof is preferably 1 wt % or less because excessive addition results in an adverse influence such as a reduction in voltage holding ratio characteristics.

Since the above-described silane coupling agent including a trihalosilane-based compound has high hydrolyzability, a solvent without a hydroxyl group or a carbonyl group is preferably used.

In the case of using the silane coupling agent including a trialkoxysilane-based compound, a carboxylic acid may be added as a catalyst to further promote a hydrolysis reaction.

Further, a region in which reduced is the speed of diffusion of liquid crystal can be formed using a substance having a photocatalytic function. The photocatalytic substance has photocatalytic activity. Therefore, a surface of the substance is activated by light irradiation, so that the surface of the substance can be modified by energy generated from the activation. In this case, a region which is selectively not irradiated with light serves as a liquid repellent layer. After an orientation film is subjected to rubbing treatment, a liquid repellent layer including a photocatalytic substance is formed over an entire surface of the orientation film by a spin coating method or the like. After that, light irradiation is selectively performed using a metal mask or the like to decompose the liquid repellent layer. In the present invention, a region which surrounds a region where the orientation film is formed and a region inside a region where a sealant is to be formed later are selectively shielded from light.

Titanium oxide ($TiO_x$), strontium titanate ($SrTiO_3$), cadmium selenide (CdSe), potassium tantalate ($KTaO_3$), cadmium sulfide (CdS), zirconium oxide ($ZrO_2$), niobium oxide ($Nb_2O_5$), zinc oxide (ZnO), iron oxide ($Fe_2O_3$), tungsten oxide ($WO_3$), or the like is desirable for the photocatalytic substance. The photocatalytic substance may be irradiated with light in the ultraviolet region (having the wavelength of 400 nm or less, preferably 380 nm or less) to generate photocatalytic activity.

The light used for the treatment of modifying the property is not particularly limited, and any one of infrared light, visible light, ultraviolet light or a combination thereof can be used. For example, light emitted from an ultraviolet lamp, a black light, a halogen lamp, a metal halide lamp, a xenon arc lamp, a carbon arc lamp, a high-pressure sodium lamp, or a high-pressure mercury lamp may be used. In this case, light from a light source may be emitted for a required period or emitted several times.

Further, in order to narrow the frame, the outer periphery of the sealant is formed into a rectangular shape, and conductive particles are located inside the rectangle. The conductive particles are located to electrically connect the counter electrode provided on the counter substrate and the connection wiring connected to the terminal portion. The conductive particles are formed using a fluid including a plurality of conductive particles in a resin by a dispensing method. Accordingly, it is difficult to perform electrical conduction in the case where an insulating film such as an orientation film and conductive particles overlap with each other. Therefore, it is preferable that, before the pair of substrate is attached to each other, a conductive portion in which conductive particles are located be formed at a position which does not overlap with the first orientation film, the second orientation film, and the coating portion. It is to be noted that, since the resin is spread after the pair of substrates is attached, part of the resin including the conductive particles may overlap with the insulating film such as the orientation film. It is to be noted that at least one conductive portion in which conductive particles are located may be provided.

When the liquid crystal material is dripped, the Liquid crystal material is preferably heated and dripped by a dispensing method to reduce the viscosity of the liquid crystal material. In order to prevent the liquid crystal material from being spread and being in contact with the sealant at the time of dripping, the surface temperature of a substrate on which the liquid crystal material is dripped is preferably set to be lower than at least the temperature of the liquid crystal at the time of dripping. Further, the substrate on which the liquid crystal material is dripped may be cooled so that the viscosity of the liquid crystal material is increased at the time of dripping.

Furthermore, in order to prevent the liquid crystal material from being spread and being in contact with the sealant at the time of dripping, the dripping amount per spot where the liquid crystal is dripped may be decreased and thus dripping may be performed at plural spots without entirely dripping the liquid crystal at one spot.

When the pair of substrates is attached to each other, the sealant which is not cured and the liquid crystal come in contact with each other. Accordingly, a panel structure in which unevenness does not occur in the inner periphery of the sealant can be realized.

DETAILED DESCRIPTION OF THE INVENTION

Embodiment Mode

Figure 1A:
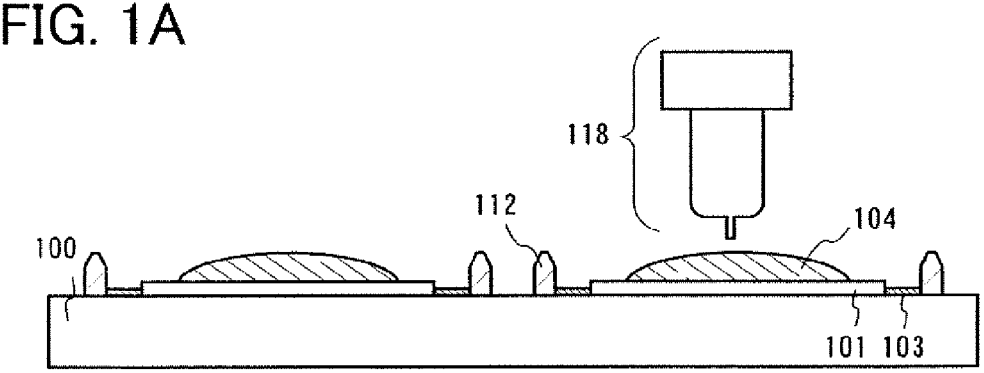
FIGS. 1A to 1D are cross-sectional views and a perspective view which illustrate part of a manufacturing process.

Embodiment modes of the present invention are described below.

Embodiment Mode 1

Here, an example of performing drawing of a sealant and liquid crystal dripping on the side of one of substrates and attaching a pair of substrates is described below.

First, a first orientation film 101 is formed over a first substrate 100. For the first substrate 100, glass substrates used for electronics industry (also called a "non-alkali glass substrate") such as an aluminosilicate glass substrate, an aluminoborosilicate glass substrate, or a barium borosilicate glass substrate; a quartz substrate; a ceramic substrate; a plastic substrate; or the like can be used, as appropriate.

For the first orientation film 101, a liquid material for forming a horizontal orientation film, for example polyimide is selectively applied by an off-set printing method, a screen printing method, or the like, and baking is performed. Rubbing treatment is performed after the baking, and thus, the first orientation film 101 is formed. Pretilt angles of 0.1° to 10° of liquid crystal are set by the rubbing treatment so that a horizontal orientation state can be obtained.

If the first orientation film 101 has the area almost the same as a region to be a display region later, when a second orientation film is formed later, there is a concern that orientation of liquid crystal molecules due to the second orientation film may affect orientation of liquid crystal molecules in the display region. Therefore, the first orientation film 101 is made to have the area sufficiently larger than the area of the region to be the display region.

It is to be noted that a substrate to which liquid crystal is dripped is referred to as a first substrate and a substrate to be attached to the first substrate is referred to as a second substrate. In the case of forming a pixel portion including TFTs over the first substrate, the second substrate serves as a counter substrate. In the case of forming a pixel portion including TFTs over the second substrate, the first substrate serves as a counter substrate.

Then, a second orientation film 103 is formed. Since rubbing treatment had been performed on the first orientation film 101, the second orientation film 103 is formed by an off-set printing method, or a droplet discharge method such as a dispenser method or an ink-jet method. The second orientation film 103 makes pretilt angles of liquid crystal molecules be 80° to 90° just by applying and baking without performing orientation treatment such as rubbing treatment; thus, a vertical orientation state can be obtained. Here, for the second orientation film 103, a material for forming a vertical orientation film is used. The material for forming a vertical orientation film includes an organic resin formed from a material in which a long-chain alkyl group or a functional group with a plain structure is introduced into the side chain, though the main skeleton thereof is polyimide which is the same as the first orientation film. With the use of such a material for forming a vertical orientation film, when, for example, the main chain portion is aligned horizontally with respect to a substrate surface, the side chain portion can make liquid crystal molecules orient almost vertically. The second orientation film 103 is formed into a closed-frame shape so as to surround the first orientation film 101. The inner periphery of the second orientation film 103 is aligned with the outer periphery of the first orientation film 101. If there is a space between the first orientation film 101 and the second orientation film 103, there is a concern that an orientation state of liquid crystal molecules may be disordered. So, it is preferable that the second orientation film 103 partly overlap with the first orientation film 101 so as to prevent the space.

Then, a sealant 112 with a closed pattern is formed by a droplet discharge method such as a dispensing method or an ink-jet method. As the sealant 112, a material containing a visible light curable resin, an ultraviolet curable resin, or a thermosetting resin can be used. For example, an epoxy resin such as a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. As the sealant 112, a sealant having a viscosity of 40 to 400 Pa·s is used.

The sealant 112 is formed into a closed-frame shape without a liquid crystal inlet. The sealant 112 is disposed so that the inner periphery thereof is aligned with the outer periphery of the second orientation film 103. It is to be noted that the sealant is formed so as to leave a space, in which the sealant will increase in width, between the sealant and the outer periphery of the second orientation film 103, in consideration of increase in width of the sealant in a later step of attaching a pair of substrates.

The sealant 112 may include a gap material (filler with a diameter of 1 to 24 μm, fine particles, or the like) which keeps a space between the pair of substrates. When the size of a panel is less than or equal to 2 inches, a space between a pair of substrates can be kept by a gap material included in a sealant without a columnar spacer or a spherical spacer in a pixel portion.

Then, a liquid crystal material 104 is dripped to the first orientation film 101 by a droplet discharge method such as a dispenser method or an ink-Jet method. Here, the liquid crystal material 104 is dripped the viscosity of which is reduced by heating using a liquid crystal dispenser 118. FIG. 1A illustrates a cross-sectional view in this step.

Figure 1B:
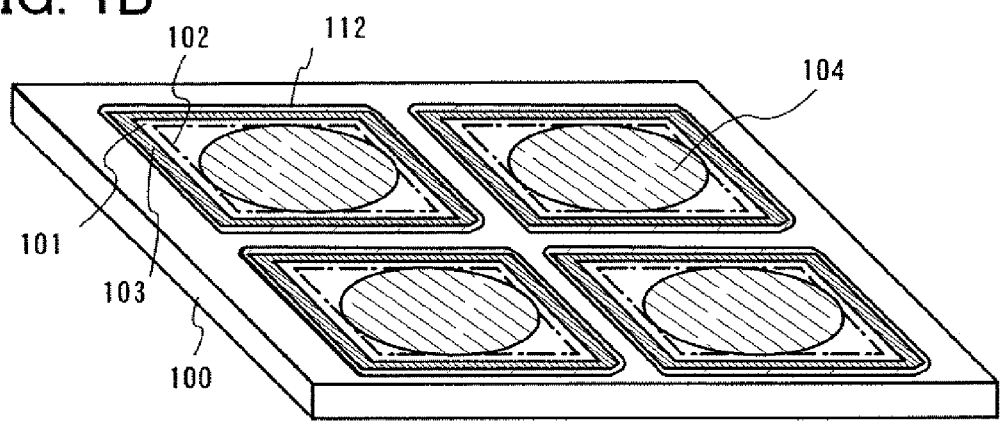

FIG. 1B illustrates a perspective view of FIG. 1A. In FIG. 1B, a region 102 indicated by a dashed line corresponds to a region to be a display region later.

Figure 1C:
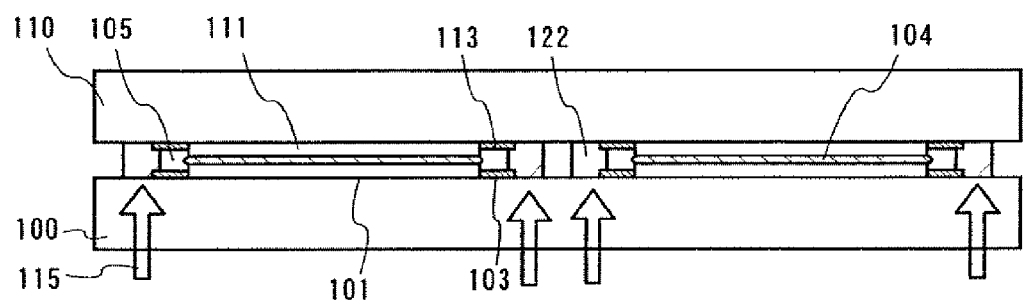
Figure 1D:
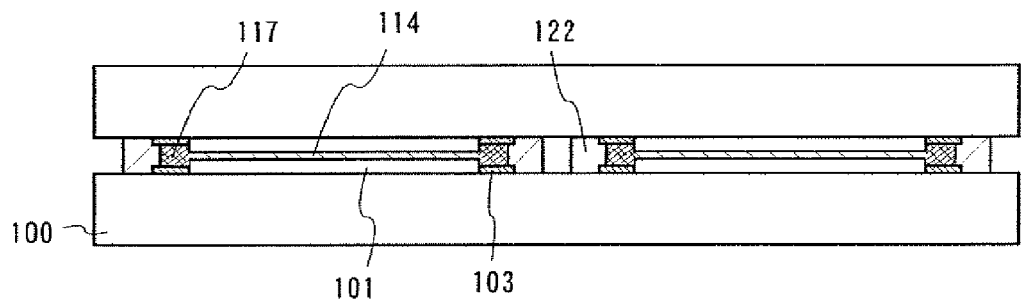

Subsequently, a second substrate 110 is attached under reduced pressure. FIG. 1C shows the state upon the attachment. FIG. 1D shows the state where more time has passed, and thus, a space is filled with liquid crystal.

The second substrate 110 is preferably formed from a material having a thermal expansion coefficient which is almost the same as that of the first substrate 100 so that the sealant is not broken by deformation due to heat when a liquid crystal display device is obtained later. Further, as each of the first substrate 100 and the second substrate 110, a plastic substrate having flexibility can be used, whereby a liquid crystal display device having flexibility can also be manufactured.

A third orientation film 111 and a fourth orientation film 113 are formed on the second substrate 110 in advance. Although not shown, an electrode, a thin film transistor, or the like for driving liquid crystal is formed. Belt-like electrodes are arranged over the first substrate 100 and on the second substrate 110, and a pair of substrate is attached to each other so that electrodes formed over/on each substrate intersect. Thus, a passive matrix liquid crystal display device can be manufactured.

Alternatively, a counter electrode is formed over the first substrate 100, and a thin film transistor and a pixel electrode which is electrically connected to the thin film transistor are formed on the second substrate 110. The pair of substrates is attached to each other, and thus, an active matrix liquid crystal display device can be manufactured.

The third orientation film 111 is formed using the same formation method and the same material as the first orientation film 101, and the third orientation film 111 has almost the same area as the first orientation film 101. However, the direction of rubbing treatment in the third orientation film 111 is different from that in the first orientation film 101. The pair of substrates is attached to each other so that the rubbing direction of the third orientation film 111 is almost orthogonal to that of the first orientation film 101.

The fourth orientation film 113 is formed using the same formation method and the same material as the second orientation film 103, and has almost the same closed-frame shape as the second orientation film 103.

As shown in FIG. 1C, the sealant is pressed upon the attachment, so that a sealant 122 with an increased width is obtained. Part of the sealant 122 with an increased width overlaps with the second orientation film 103 and the fourth orientation film 113. If there is a space between the sealant 122 with an increased width and the second orientation film 103 in the state after the attachment of the pair of substrates, there is a concern that an orientation state of liquid crystal molecules may be disordered. Therefore, it is preferable that the sealant 122 with an increased width and the second orientation film 103 partly overlap as shown in FIG. 1C. Accordingly, light leakage at the time of obtaining a liquid crystal display device can be suppressed.

Although the liquid crystal material 104 is spread between the first orientation film 101 and the third orientation film 111, there is still a space 105 with reduced pressure between the liquid crystal material 104 and the sealant 122 with an increased width. In such a state where the liquid crystal material 104 and the sealant 122 with an increased width are not in contact with each other, irradiation with ultraviolet 115 is performed, so that photo-curing of the sealant 122 with an increased width is started. Subsequently, after part of the sealant 122 with an increased width, preferably the inner periphery of the sealant 122, is cured, the cured sealant and the liquid crystal material are in contact with each other with the liquid crystal material spread.

It is to be noted that irradiation with the ultraviolet 115 is selectively performed. The irradiation may be performed on an entire surface of the substrate as long as the liquid crystal material is not changed in quality by irradiation with ultraviolet.

Thus, the state where the inside of the sealant 122 with an increased width is filled with the liquid crystal material, that is, the state shown in FIG. 1D is obtained. Finally, heat treatment for adjusting orientation of the liquid crystal molecules is performed if necessary.

In such a manner, a first orientation region 114 in a liquid crystal layer is formed between the first orientation film 101 and the third orientation film 111, and a second orientation region 117 in the liquid crystal layer is formed between the second orientation film 103 and the fourth orientation film 113.

Here, an example is described where liquid crystal is dripped to a substrate over which a sealant is drawn. However, the present invention is not particularly limited. A second substrate over which a sealant is drawn may be attached after liquid crystal is dripped to a first substrate.

Here, an example is described where after the first orientation film is formed, the second orientation film is formed, and the sealant is further formed. However, the present invention is not particularly limited. The first orientation film may be formed and the sealant may be further formed after the second orientation film is formed in advance.

Further, here, a so-called multi-panel method is described in which four liquid crystal panels are manufactured using a pair of substrates. In a liquid crystal dripping method, liquid crystal can be sealed before division in such a multi-panel method. Therefore, it is suitable for mass production. It is needless to say that the present invention can be applied to a method for manufacturing one liquid crystal panel per substrate, instead of the multi-panel method.

Embodiment Mode 2

This embodiment mode describes an example of forming a coating portion having a layer which offers a contact angle with liquid crystal of greater than 40° and less than 130°, which is measured by an FTÅ125 (manufactured by First Ten Ångstroms, Inc.) by using a liquid repellent treatment agent. A contact angle with liquid crystal is smaller than a contact angle with water with respect to the same liquid repellent treatment agent, and the contact angle varies depending on a liquid crystal material. Therefore, the combination between a liquid repellent treatment agent and a liquid crystal material is selected as appropriate, so that a coating portion having a layer which offers a contact angle with liquid crystal of greater than 40° and less than 130° is formed. If the contact angle with the liquid crystal is less than 40°, it is difficult to reduce the speed of diffusion of the liquid crystal. If the contact angle with the liquid crystal is greater than or equal to 130°, the shape of the contact area with the liquid crystal becomes nearly a point. Accordingly, part of the liquid crystal is formed into nearly a spherical shape and thus is easily moved. Therefore, there is a concern that part of the liquid crystal comes in contact with the sealant. It is to be noted that the same portions as in FIGS. 1A to 1D are denoted by the same reference numerals for explanation.

First, the first orientation film 101 is formed as in Embodiment Mode 1.

Then, a coating portion 133 with a closed-frame shape is formed. In this embodiment mode, the coating portion 133 is formed instead of the second orientation film 103. The coating portion 133 is formed using a liquid repellent treatment agent by a droplet discharge method such as a dispensing method or an ink-jet method. The coating portion refers to a region over a surface of which a self-assembled monolayer is formed. The self-assembled monolayer is obtained in such a way that a liquid repellent treatment agent is applied and baking is performed to remove a solvent.

The coating portion 133 is formed into a closed-frame shape so as to surround the first orientation film 101. The coating portion 133 is disposed so that the inner periphery of the coating portion 133 is aligned with the outer periphery of the first orientation film 101 as much as possible. The alignment of the first orientation film 101 and the coating portion 133 is important; therefore, an ink-Jet method is preferably used. An ink-jet method is performed in such a way that a small amount of liquid is ejected (or dripped) in the form of a plurality of drops. By an ink-jet method, the small amount of a liquid repellent treatment agent can be freely adjusted by the number of discharging, the number of discharging points, or the like.

Here, octadecyltrimethoxysilane (also referred to as ODS) is used for the liquid repellent treatment agent. In the case where the coating portion 133 is formed using octadecyltrimethoxysilane, liquid crystal molecules can be oriented with the long axes perpendicular to a substrate surface, owing to the obtained self-assembled monolayer. Therefore, the obtained self-assembled monolayer can also be referred to as a second orientation film which is extremely thin. It is needless to say that a material for the liquid repellent treatment agent is not limited to octadecyltrimethoxysilane, and a material which does not affect orientation of liquid crystal may be used.

Then, a sealant with a closed pattern is formed by a droplet discharge method such as a dispensing method or an ink-jet method. However, the sealant is formed so as to leave a space, in which the sealant will increase in width, between the sealant and the outer periphery of the coating portion 133, in consideration of increase in width of the sealant in a later step of attaching a pair of substrates.

Then, the liquid crystal material 104 is dripped to the first orientation film 101 by a droplet discharge method such as a dispensing method or an ink-jet method.

Figure 2A:
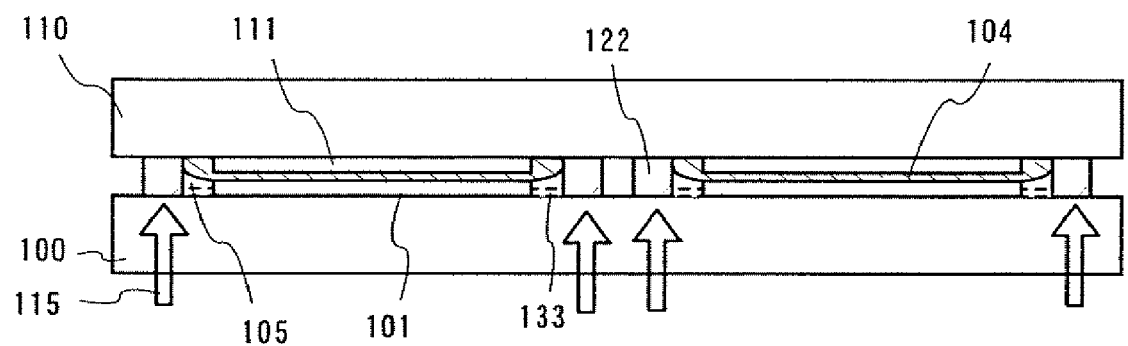
FIGS. 2A and 2B are cross-sectional views illustrating part of a manufacturing process.
Figure 2B:
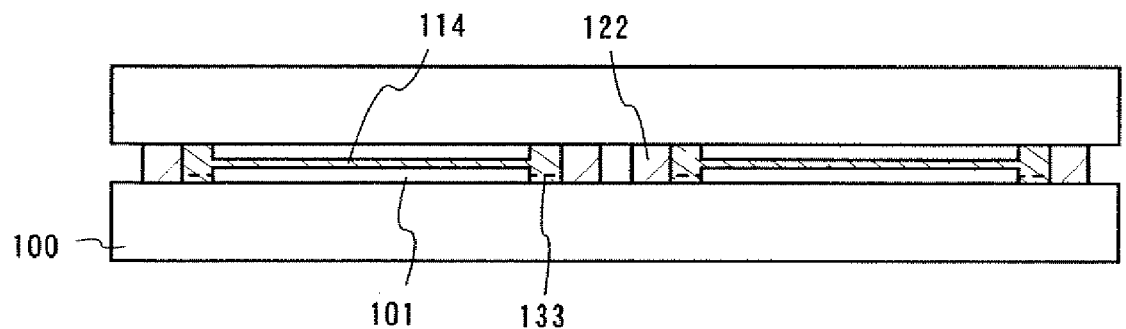

Subsequently, a second substrate 110 is attached under reduced pressure. FIG. 2A shows the state upon the attachment. FIG. 2B shows the state where more time has passed, and thus, a space is filled with liquid crystal.

The third orientation film 111 is formed on the second substrate 110 in advance. The third orientation film 111 is formed using the same formation method and the same material as the first orientation film 101, and the third orientation film 111 has almost the same area as the first orientation film 101. However, the direction of rubbing treatment in the third orientation film 111 is different from that of the first orientation film 101. The pair of substrates is attached to each other so that the rubbing direction of the third orientation film 111 is almost orthogonal to that of the first orientation film 101.

As shown in FIG. 2A, the sealant is pressed upon the attachment, so that a sealant 122 with an increased width is obtained. Thus, the inner periphery of the sealant 122 with an increased width is almost aligned with the outer periphery of the coating portion 133 or a space is left therebetween.

Although the liquid crystal material 104 is spread between the first orientation film 101 and the third orientation film 111, there is still a space 105 with reduced pressure between the liquid crystal material 104 and the sealant 122 with an increased width.

This embodiment mode describes an example in which only one of the pair of substrates is provided with the coating portion 133. Therefore, irradiation with the ultraviolet 115 is performed in the state where the liquid crystal material 104 and the sealant 122 with an increased width are partly in contact with each other, so that photo-curing of the sealant 122 with an increased width is started. Subsequently, after part of the sealant 122 with an increased width, preferably the inner periphery of the sealant 122, is cured, the cured sealant and the liquid crystal material are in contact with each other with the liquid crystal material spread.

Even when only one of the pair of substrates is provided with the coating portion 133 as described above, at least part of the sealant can be cured. Accordingly, unevenness hardly occurs in the inner periphery of the sealant as compared to the case where the coating portion 133 is not provided.

It is needless to say that each of the pair of substrates may be provided with a coating portion.

Thus, the state where inside the sealant 122 with an increased width is filled with the liquid crystal material, that is, the state shown in FIG. 2B is obtained. Finally, heat treatment for adjusting orientation of the liquid crystal molecules is performed if necessary.

Here, an example is described where after the first orientation film is formed, the coating portion is formed, and the sealant is further formed. However, the present invention is not particularly limited thereto. The first orientation film may be formed and the sealant may be further formed after the coating portion is formed in advance.

This embodiment mode can be freely combined with Embodiment Mode 1. For example, a structure may be used in which a second orientation film with a closed-frame shape is formed outside a first orientation film, a coating portion is further provided in a region with the closed-frame shape, and a sealant is disposed outside the coating portion.

Further, this embodiment mode may be combined with Embodiment Mode 1, so that a liquid crystal panel may be manufactured in which the substrate provided with the coating portion which is obtained in this embodiment mode and the substrate provided with the second orientation film which is obtained in Embodiment Mode 1 are attached to each other.

Embodiment Mode 3

The flow of panel manufacturing is hereinafter explained. FIGS. 3A to 3G illustrate main process cross-sectional views.

First, a counter electrode 222 formed of a transparent conductive film is formed over a first substrate 220 serving as a counter substrate. For the transparent conductive film, indium tin oxide, zinc oxide, indium zinc oxide, zinc oxide to which gallium is added, or the like is used. Further, the counter electrode 222 can be formed using a conductive composition including a conductive high molecule (also referred to as a conductive polymer). The counter electrode formed using a conductive composition preferably has sheet resistance of less than or equal to 10000 Ω/□ and has the rate of light transmission at a wavelength of 550 nm of greater than or equal to 70%. Further, resistivity of a conductive high molecule included in the conductive composition is preferably equal to or lower than 0.1 Ω·cm.

As a conductive high molecule, a so-called π electron conjugated conductive high-molecule can be used. For example, polyaniline or a derivative thereof, polypyrrole or a derivative thereof, polythiophene or a derivative thereof, and a copolymer of two or more kinds of those materials can be given.

Specific examples of a conjugated conductive high-molecule are given below: polypyrrole, poly(3-methylpyrrole), poly(3-butylpyrrole), poly(3-octylpyrrole), poly(3-decylpyrrole), poly(3,4-dimethylpyrrole), poly(3,4-dibutylpyrrole), poly(3-hydroxypyrrole), poly(3-methyl-4-hydroxypyrrole), poly(3-methoxypyrrole), poly(3-ethoxypyrrole), poly(3-octoxypyrrole), poly(3-carboxylpyrrole), poly(3-methyl-4-carboxylpyrrole), polyN-methylpyrrole, polythiophene, poly(3-methylthiophene), poly(3-butylthiophene), poly(3-octylthiophene), poly(3-decylthiophene), poly(3-dodecylthiophene), poly(3-methoxythiophene), poly(3-ethoxythiophene), poly(3-octoxythiophene), poly(3-carboxylthiophene), poly(3-methyl-4-carboxylthiophene), poly(3,4-tethylenedioxythiophene), polyaniline, poly(2-methylaniline), poly(2-octylaniline), poly(2-isobutylaniline), poly(3-isobutylaniline), poly(2-anilinesulfonic acid), poly(3-anilinesulfonic acid), and the like.

A columnar spacer 215 is formed over the counter electrode 222. Instead of a columnar spacer, a spherical spacer may be dispersed entirely on the substrate surface.

Figure 3A:
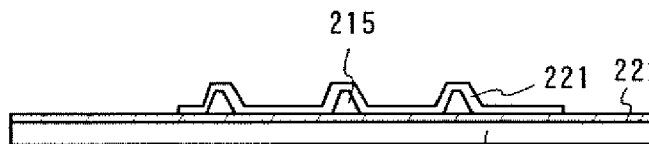
FIGS. 3A to 3G illustrate process cross-sectional views.

A first orientation film 221 which covers the counter electrode 222 and the columnar spacer 215 is formed. Then, rubbing treatment is performed on the first orientation film 221. A process cross-sectional view in this step is shown in FIG. 3A.

Figure 3B:
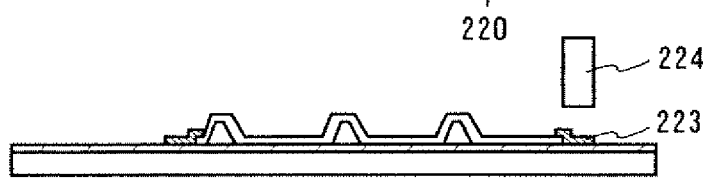

A second orientation film 223 which overlaps with an end portion of the first orientation film 221 is formed by an ink-jet apparatus 224. The second orientation film 223 is formed into a closed-frame shape so as to surround the first orientation film 221. The second orientation film 223 gives liquid crystal an orientation state different from that of the first orientation film 221. A process cross-sectional view in this step is shown in FIG. 3B.

Figure 3C:
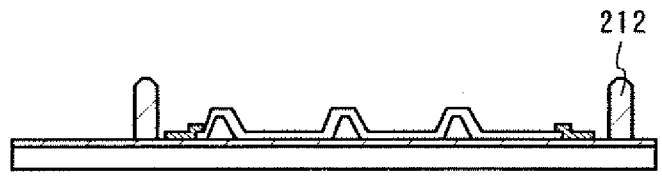

Then, a sealant 212 is formed on the counter electrode 122 so as to be apart from the second orientation film 223. The sealant 212 is drawn using a screen printing method, an ink-jet apparatus, or a dispensing apparatus. For the sealant 212, an acrylic-based photo-curing resin or the like may be used. For the sealant 212, a sealant which includes a filler (diameter of 6 μm to 24 μm) and has a viscosity of 40 Pa·s to 400 Pa·s is used. It is to be noted that the sealant which is not dissolved in liquid crystal to be in contact later is preferably selected. A process cross-sectional view in this step is shown in FIG. 3C.

Then, liquid crystal is dripped to the first orientation film 221. The dripping of the liquid crystal is performed using an ink-jet apparatus or a dispensing apparatus. As shown in FIG. 3θ, liquid crystal 214 is dripped in a region, which is surrounded by the sealant 212, by using a liquid crystal dispenser 218 under atmospheric pressure. For the liquid crystal 214, a known liquid crystal material having a viscosity which enables dripping may be used. With the use of the liquid crystal dispenser 218, only the needed amount of the liquid crystal 214 can be held without waste in the region surrounded by the sealant 212. Alternatively, the liquid crystal may be dripped using an ink-jet method.

Then, a pair of substrates is attached to each other under reduced pressure. A process cross-sectional view in this step is shown in FIG. 3E. A pixel electrode 211 and a terminal electrode 213 are formed over a second substrate 210 in advance. Further, a third orientation film 231 which covers the pixel electrode 211 is formed, and a fourth orientation film 233 is formed. An end face of the fourth orientation film 233 is almost aligned with that of the third orientation film 231. The fourth orientation film 233 is formed into a closed-frame shape so as to surround the third orientation film 231.

This embodiment mode describes an example in which the area of the second orientation film 223 is different from that of the fourth orientation film 233.

Upon attachment of the substrates, the sealant is irradiated with ultraviolet. The speed of diffusion of the liquid crystal is reduced by the second orientation film 223 or the fourth orientation film 233, so that the sealant can be subjected to photo-curing before the liquid crystal comes in contact with the sealant.

Then, heat treatment is performed, so that the sealant 212 is further cured and the liquid crystal is heated to align the orientation of the liquid crystal molecules. A process cross-sectional view in this step is shown in FIG. 3F. By the heat treatment, a space between the substrates is fixed. As shown in FIG. 3F; the space between the substrates is kept by the columnar spacers 215.

Here, the sealant is cured by the heat treatment performed after the irradiation with ultraviolet. However, the present invention is not particularly limited thereto, and the curing is performed so that sufficient characteristics of adhesion of the sealant, such as seal strength of greater than or equal to 200 N/cm$^2$, are obtained.

Figure 3D:
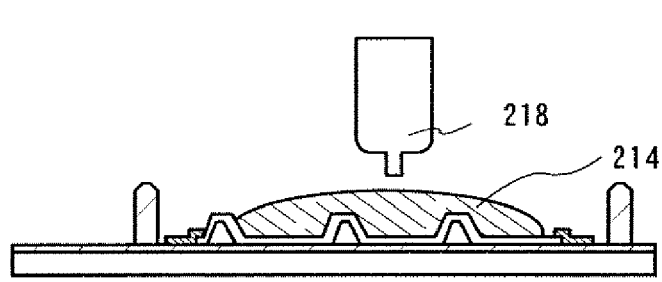
Figure 3E:
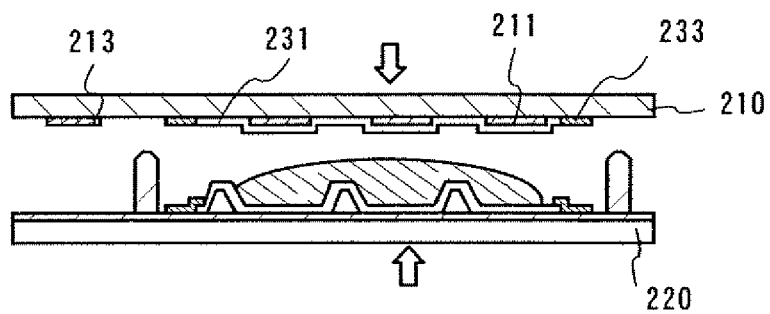
Figure 3F:
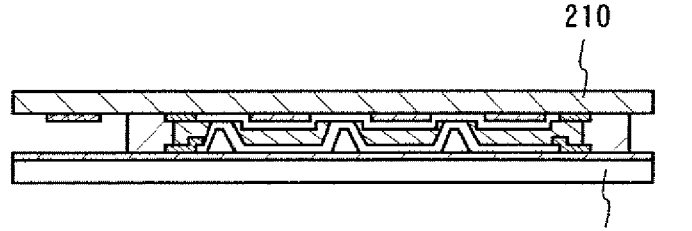
Figure 3G:
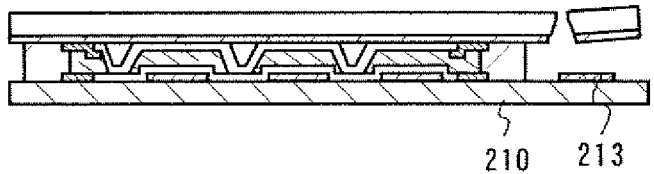

As shown in FIG. 3G, the substrate is divided. A groove for scribing is formed, and pressure is applied along a line of the scribing to perform division, so that the terminal electrode 213 is exposed.

This embodiment mode describes an example in which the columnar spacer 215 is formed over the first substrate 220 serving as a counter substrate. However, the present invention is not particularly limited thereto, and the columnar spacer 215 may be formed over the second substrate 210.

This embodiment mode can be freely combined with Embodiment Mode 1 or Embodiment Mode 2.

Embodiment Mode 4

This embodiment mode describes an example in which a conductive portion is provided with the use of conductive particles in order to electrically connect a counter electrode provided on one of substrates and a connection wiring provided over the other of the substrates.

Figure 4A:
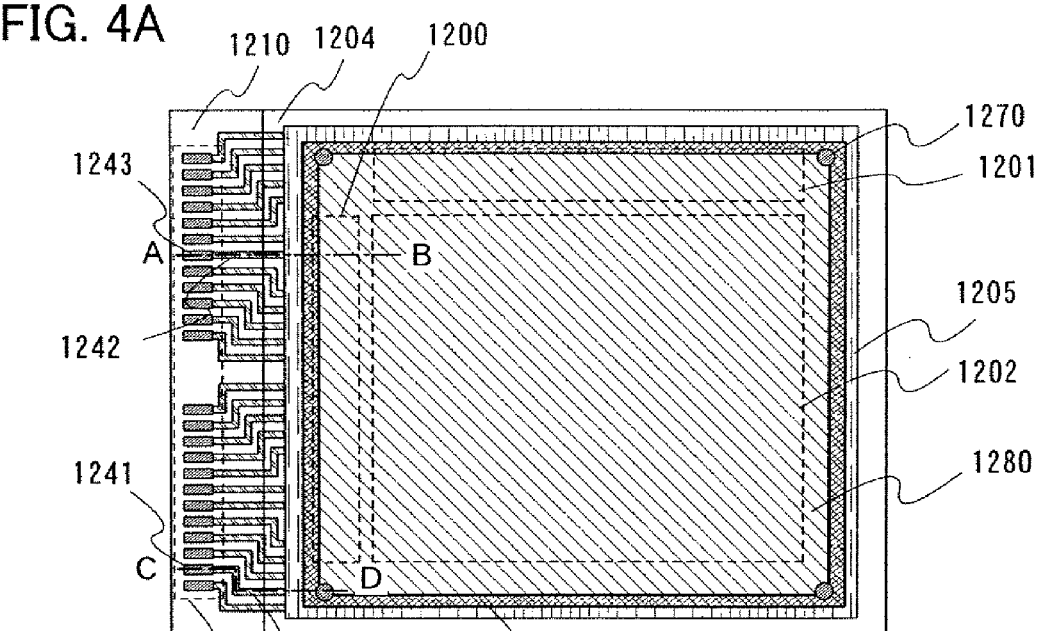
FIGS. 4A to 4C illustrate a top view and cross-sectional views of a liquid crystal display device.
Figure 4B:
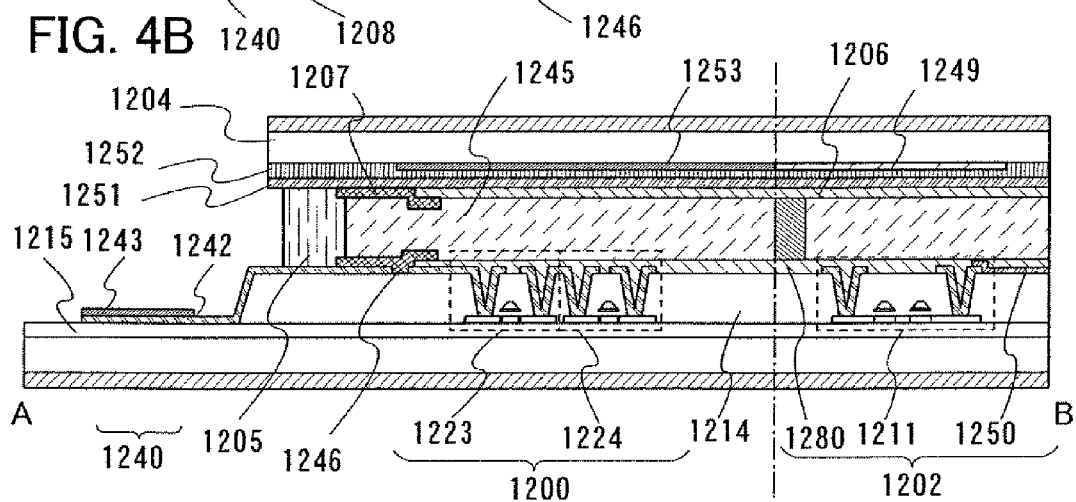
Figure 4C:
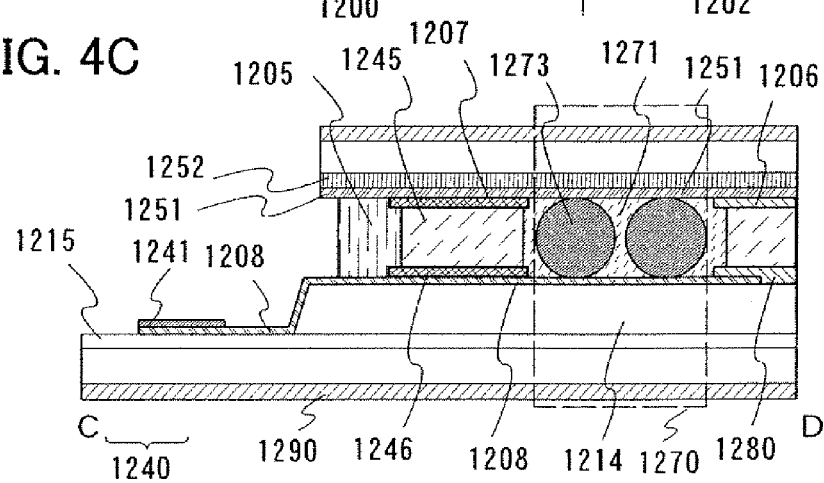

FIG. 4A is a top view of a liquid crystal display device in which an FPC has not been attached to a terminal portion 1240 of a second substrate 1210. FIG. 4B is a cross-sectional view taken along line A-B of FIG. 4A which illustrates a connection region of a pixel region and a connection wiring. FIG. 4C is a cross-sectional view taken along line C-D of FIG. 4A which illustrates a conductive portion to be a connection portion of a conductive particle and a connection wiring.

As shown in FIG. 4A, a liquid crystal display device includes a first substrate 1204 and a second substrate 1210 which are attached to each other with a sealant 1205. For the second substrate 1210 and the first substrate 1204, a glass substrate (also referred to as an "alkaline-free glass substrate"), a quartz substrate, a ceramic substrate, a plastic substrate, or the like can be used, as appropriate.

A pixel region 1202 surrounded by a dotted line, and a signal line driver circuit 1200 and a scan line driver circuit 1201 which are used for driving a plurality of pixels arranged in the pixel region 1202 are formed over the second substrate 1210. Further, a terminal portion 1240 is formed in an end portion of the second substrate 1210. In the terminal portion 1240, a plurality of connection terminals is formed over a plurality of respective connection wirings.

The pixel region 1202, the signal line driver circuit 1200, and the scan line driver circuit 1201 are disposed inside the inner periphery of the sealant 1205. Part of the signal line driver circuit 1200, part of the scan line driver circuit 1201, and the pixel region 1202 are covered with the first orientation film 1280. The second orientation film 1246 is disposed between the sealant 1205 and the first orientation film 1280. The second orientation film 1246 overlaps with part of the signal line driver circuit 1200 as shown in FIG. 4B.

The conductive portion 1270 is disposed between the first orientation film 1280 and the second orientation film 1246.

As shown in FIG. 41, the pixel region 1202 includes a pixel electrode 1250 and a switching TFT 1211 which is electrically connected to the pixel electrode 1250. Further, the pixel region 1202 includes a capacitor. In this embodiment mode, a mode of an active matrix liquid crystal display device is used. Accordingly, the pixel electrode 1250 and the connection wiring 1242 are not directly connected to each other but are connected to each other via the switching TFT 1211 or the signal line driver circuit 1200. An FPC and the connection wiring 1242 are electrically connected to each other via a connection terminal 1243 disposed in the connection portion 1240.

The signal line driver circuit 1200 includes a CMOS circuit having an n-channel TFT 1223 and a p-channel TFT 1224. It is to be noted that the signal line driver circuit 1200 or the scan line driver circuit 1201 shown in FIG. 4A may be formed using a CMOS circuit, PMOS circuit, or an NMOS circuit.

As an insulating layer 1215, an insulating layer serving as a base film may be formed, and the insulating layer 1215 is formed to have a single layer structure or stacked structure of silicon oxynitride, silicon nitride oxide, silicon oxide, and silicon nitride.

The switching TFT 1211, the n-channel TFT 1223, and the p-channel TFT 1224 each include a semiconductor layer having a source region, a drain region, and a channel formation region; a gate insulating layer; and a gate electrode.

The semiconductor layer is a layer formed using a non-single crystal semiconductor or a single-crystal semiconductor which has a thickness of greater than or equal to 10 nm and less than or equal to 100 nm, furthermore greater than or equal to 20 nm and less than or equal to 70 nm. As a non-single crystal semiconductor layer, a crystalline semiconductor layer, an amorphous semiconductor layer, a microcrystalline semiconductor layer, or the like can be used. As the semiconductor, silicon, germanium, a silicon germanium compound, or the like can be used. In particular, it is preferable to use a crystalline semiconductor which is formed by crystallization through rapid thermal annealing (RTA) or thermal treatment using an annealing furnace, or a crystalline semiconductor which is formed by crystallization through heat treatment and laser beam irradiation. In the heat treatment, a crystallization method using a metal element such as nickel which has an effect of promoting crystallization of a silicon semiconductor can be applied.

In the case of performing crystallization by laser light irradiation in addition to heat treatment, crystallization can be performed by continuously moving a melted zone of the crystalline semiconductor, which is melted by irradiation with a continuous wave laser beam or a high-repetition-rate ultrashort pulsed laser beam having a repetition rate of 10 MHz or higher and a pulse width of 1 nanosecond or shorter, preferably in the range of 1 picosecond to 100 picoseconds inclusive, along the laser beam irradiation direction. By using such a crystallization method, a crystalline semiconductor having a large grain diameter with a crystal grain boundary extending in one direction can be obtained.

In the case where the semiconductor layer is formed using a single-crystal semiconductor, a single-crystal semiconductor substrate provided with a silicon oxide layer is bonded to the second substrate 1210 and part of the single-crystal substrate is polished or separated; accordingly, a semiconductor layer using a single-crystal semiconductor can be formed over the second substrate 1210.

The gate insulating layer is formed from an inorganic insulator such as silicon oxide or silicon oxynitride which has a thickness of greater than or equal to 5 nm and less than or equal to 50 nm, preferably greater than or equal to 10 nm and less than or equal to 40 nm.

The gate electrode can be formed from a polycrystalline semiconductor to which metal or an impurity of one conductivity type is added. In the case of using metal, tungsten (W), molybdenum (Mo), titanium (Ti), tantalum (Ta), aluminum (Al), or the like can be used. Further, metal nitride formed by nitriding metal can be used. Alternatively, the gate electrode may have a stacked structure of a first layer made of the metal nitride and a second layer made of the metal. By forming the first layer using metal nitride, the first layer can be used as a metal barrier. That is, the metal of the second layer can be prevented from being spread into the gate insulating layer or the semiconductor layer below the gate insulating layer In the case of employing a stacked structure, the gate electrode may have a shape in which an edge of the first layer extends beyond an edge of the second layer.

For the switching TFT 1211, the n-channel TFT 1223, and the p-channel TFT 1224 each of which is formed by combination of a semiconductor layer, a gate insulating layer, a gate electrode, and the like, various kinds of structures can be used, such as a single-drain structure, an LDD (lightly-doped drain) structure, and a gate-overlapped drain structure. Here, a thin film transistor having an LDD structure is described. Moreover, a multi-gate structure where transistors, to which a gate voltage which is the same potential is equally applied, are serially connected; a dual-gate structure where the semiconductor layer is sandwiched by gate electrodes; an inversely staggered thin film transistor; or the like can be used.

Wirings which are in contact with the source region and drain region of the semiconductor layers are preferably formed by combination of a low-resistance material such as aluminum and a barrier metal using a high-melting-point metal material such as titanium or molybdenum, e.g., a stacked structure of titanium and aluminum or a stacked structure of molybdenum and aluminum.

As the thin film transistor, a thin film transistor using metal oxide or an organic semiconductor material for a semiconductor layer can be used. As typical examples of the metal oxide, zinc oxide, oxide of zinc gallium indium, and the like can be given.

The pixel electrode 1250 connected to one of electrodes of the switching TFT 1211 exists over the insulating layer 1214. Further, the connection wiring 1208 connected to the counter electrode via the conductive particle 1273 is formed over the insulating layer 1214. Multiple layers of the connection wiring 1208 and multiple layers of the insulating layer 1214 may overlap with each other, depending on the structure of the pixel region, the signal line driver circuit, or the scan line driver circuit. In that case, the signal line driver circuit or the scan line driver circuit can be formed in a smaller area; and thus, the area of the pixel region can be enlarged.

The first orientation film 1280 is formed over the pixel electrode 1250, and a columnar spacer 1255 is formed thereover.

FIG. 4C is a cross-sectional view of a region where the conductive particle 1273 and the connection terminal are connected to each other The connection wiring 1208 is formed over the insulating layer 1214. A connection terminal 1241 which is formed concurrently with the pixel electrode is formed over the connection wiring 1208. The connection terminal 1241 is electrically connected to the counter electrode 1251 via the connection wiring 1208 and the conductive particle 1273. Further, the connection terminal 1241 is connected to an FPC. An adhesive 1271 is a medium which makes the conductive particle 1273 easier to be discharged inside the frame of the sealant 1205. Further, the adhesive 1271 which had been cured is a medium for fixing the conductive particle 1273. The adhesive 1271 can be formed using a material similar to that of the sealant 1205.

The adhesive 1271 is spread at the time of attaching the substrates, and thus, the adhesive 1271 overlaps with an end portion of the first orientation film 1280 and an end portion of the second orientation film 1246.

The first substrate 1204 to be a counter substrate is provided with a black matrix 1253 at a position overlapping with the signal line driver circuit 1200, and a color filter 1249 and a protective layer 1252 at a position overlapping with at least the pixel region 1202. In a case where color display is performed by a color sequential method called field sequential, the color filter is not necessarily provided. The counter electrode 1251 is formed on the color filter 1249 and the protective layer 1252. The third orientation film 1206 is provided on the counter electrode 1251 which is subjected to rubbing treatment. The third orientation film 1206 is disposed at a position facing the first orientation film 1280. A fourth orientation film 1207 is provided on the counter electrode 1251. The fourth orientation film 1207 is disposed at a position facing the second orientation film 1246.

In order to further improve contrast, a first polarizing plate 1290 and a second polarizing plate 1295 are provided outside the second substrate 1210 and the first substrate 1204, respectively.

Even when the second orientation film 1246 and the fourth orientation film 1207 are provided, electrical connection can be surely performed in the conductive portion 1270. Accordingly, quality of a liquid crystal display device can be improved. Further, a liquid crystal display device can be provided which can maintain connection in the conductive portion even when the substrate is deformed by application of external force such as shock.

This embodiment mode can be freely combined with any one of Embodiment Modes 1 to 3.

The present invention including the above-described structures is described in more detail with the use of embodiments to be given below.

Embodiment 1

Figure 5:
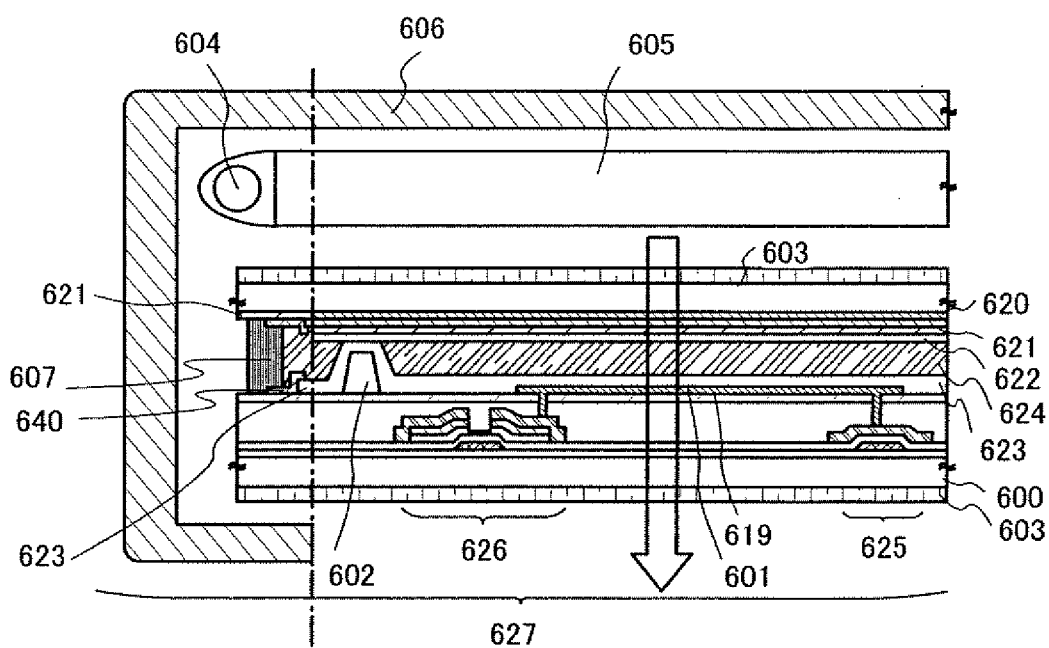
FIG. 5 is a cross-sectional structural view of an active matrix liquid crystal display device.

As shown in FIG. 5, an active matrix substrate is manufactured using a substrate 600 having a light-transmitting property. The manufacturing cost is preferably reduced by using a large-area substrate having a size of, for example, 600 mm×720 mm, 680 mm×880 mm, 1000 mm×1200 mm, 1100 mm×1250 mm, 1150 mm×1300 mm, 1500 mm×1800 mm, 1800 mm×2000 mm, 2000 mm×2100 mm, 2200 mm×2600 mm, or 2600 mm×3100 mm. As for the substrate which can be used, a glass substrate made of barium borosilicate glass, aluminoborosilicate glass, or the like typified by Corning 7059 glass, 1737 glass, or the like manufactured by Corning Incorporated can be used. As another example of the substrate, a light-transmitting substrate such as a quartz substrate can be used.

First, a conductive layer is formed over the entire surface of the substrate 600 having an insulating surface by a sputtering method. After that, a resist mask is formed by a first photolithography step, and an unnecessary portion is removed by etching to form a wiring and an electrode (such as a gate electrode, a storage capacitor wiring, and a terminal). It is to be noted that a base insulating film is formed over the substrate 600 if necessary.

The wiring and the electrode are formed using an element selected from titanium, tantalum, tungsten, molybdenum, chromium, and neodymium, an alloy containing the element as a component, or nitride containing the element as a component. Further, two or more of elements selected from titanium, tantalum, tungsten, molybdenum, chromium, and neodymium, an alloy containing the element as a component, and nitride containing the element as a component may be selected and stacked.

As a screen size gets larger, the length of each wiring is increased, and the problem of an increase in wiring resistance is caused, which causes an increase in power consumption. Therefore, in order to decrease wiring resistance and reduce power consumption, copper, aluminum, silver, gold, chromium, iron, nickel, platinum, or an alloy thereof can be used as materials of the above wiring and electrode. Further, the wiring and the electrode may also be formed by an ink-jet method using an independently dispersed ultrafine particle dispersion liquid in which ultrafine particles (each with a grain size of 5 to 10 nm) of metal such as silver, gold, copper, or palladium are dispersed at high concentration without being aggregated.

Next, a gate insulating film is formed over the entire surface by a PCVD method. The gate insulating film is formed using a stacked-layer of a silicon nitride film and a silicon oxide film with a thickness of 50 to 200 nm, preferably 150 nm. It is to be noted that the gate insulating film is not limited to a stacked-layer, and an insulating film such as a silicon oxide film, a silicon nitride film, a silicon oxynitride film, or a tantalum oxide film can also be used.

Then, over the entire surface of the gate insulating film, a first amorphous semiconductor film is formed to a thickness of 50 to 200 nm, preferably 100 to 150 nm by a known method such as a plasma CVD method or a sputtering method. Typically, an amorphous silicon (a-Si) film is formed to a thickness of 100 nm. It is to be noted that since a chamber size is increased when a film is formed over a large-area substrate, it takes long processing time to evacuate the chamber and requires a large amount of film formation gas. Therefore, further cost reduction may be achieved by forming the amorphous silicon (a-Si) film using a linear plasma CVD apparatus under atmospheric pressure.

After that, a second amorphous semiconductor film containing an impurity element imparting one conductivity type (n-type or p-type) is formed to a thickness of 20 to 80 nm. The second amorphous semiconductor film containing an impurity element imparting one conductivity type (n-type or p-type) is formed over the entire surface by a known method such as a plasma CVD method or a sputtering method. In this embodiment, the second amorphous semiconductor film containing an impurity element imparting n-type conductivity is formed using a silicon target to which phosphorus is added.

Next, a resist mask is formed by a second photolithography step, and an unnecessary portion is removed by etching to form a first island-shaped amorphous semiconductor film and a second island-shaped amorphous semiconductor film. Wet etching or dry etching is used as an etching method at this time.

Then, a conductive layer covering the second island-shaped amorphous semiconductor film is formed by a sputtering method. After that, a resist mask is formed by a third photolithography step, and an unnecessary portion is removed by etching to form a wiring and an electrode (such as a source wiring, a drain electrode, and a storage capacitor electrode), The above wiring and electrode are formed using an element selected from aluminum, titanium, tantalum, tungsten, molybdenum, chromium, neodymium, copper, silver, gold, chromium, iron, nickel, and platinum, or an alloy containing the element as a component. Alternatively, the wiring and the electrode may be formed by an ink-jet method using an independently dispersed ultrafine particle dispersion liquid in which ultrafine particles (each with a grain size of 5 to 10 nm) of metal such as silver, gold, copper, or palladium are dispersed at high concentration without being aggregated. By forming the wiring and the electrode by an ink-jet method, the photolithography step becomes unnecessary and a further cost reduction can be achieved.

Next, a resist mask is formed by a fourth photolithography step, and an unnecessary portion is removed by etching to form a source wiring, a drain electrode, and a capacitor electrode. Wet etching or dry etching is used as an etching method at this time. At this time, a storage capacitor 625 is formed which uses, as a dielectric, an insulating film made of the same material as the gate insulating film. Then, using the source wiring and the drain electrode as masks, part of the second amorphous semiconductor film is removed in a self-aligned manner and part of the first amorphous semiconductor film is thinned. The thinned region serves as a channel formation region of a TFT.

Then, a first protective film made of a silicon nitride film with a thickness of 150 nm and a first interlayer insulating film formed using a silicon oxynitride film with a thickness of 150 nm are formed over the entire surface by a plasma CVD method. It is to be noted that since a chamber size is increased when forming a film over a large-area substrate, it takes long processing time to evacuate the chamber and requires a large amount of a film formation gas. Therefore, a further cost reduction may be achieved by forming the protective film made of a silicon nitride film using a linear plasma CVD apparatus under atmospheric pressure. After that, hydrogenation is performed and a channel-etched TFT 626 is manufactured.

Although the channel-etched type is given in this embodiment as an example of the structure of the TFT, the TFT structure is not particularly limited thereto, and a channel stopper TFT, a top gate TFT, or a staggered TFT may be used.

A second protective film 619 is formed by an RE sputtering method. A silicon nitride film is formed as the second protective film 619 by sputtering a single-crystal silicon target with an $N_2$ gas or a mixed gas of $N_2$ and a rare gas under the condition that a back-pressure is set at $1 \times 10^{-3}$ Pa or less by using a turbomolecular pump or a cryopump. This dense silicon nitride film effectively prevents variations or the like in threshold voltage which is caused by contamination of the TFT due to alkali metal or alkaline earth metal such as sodium, lithium, or magnesium. Further, the silicon nitride film has an excellent blocking property against moisture or oxygen. The oxygen and hydrogen content in the silicon nitride film is preferably set at 10 at. % or less, more preferably 1 at. % or less in order to increase the blocking property.

Next, a resist mask is formed by a fifth photolithography step, and contact holes which reach the drain electrode and the storage capacitor electrode are then formed by a dry etching step. At the same time, a contact hole (not shown in the drawing) for electrically connecting the gate wiring and a terminal may be formed in a terminal portion, and a metal wiring (not shown in the drawing) for electrically connecting the gate wiring and the terminal may be formed In addition, at the same time, a contact hole (not shown in the drawing) which reaches the source wiring may be formed, and a metal wiring connected to the source wiring may be formed. A pixel electrode of an alloy of indium oxide and tin oxide or the like may be formed after forming these metal wirings, or these metal wirings may be formed after forming the pixel electrode of an alloy of indium oxide and tin oxide or the like.

Then, a transparent electrode film is formed of an alloy of indium oxide and tin oxide, an alloy of indium oxide and zinc oxide, zinc oxide, or the like with a thickness of 110 nm. After that, a sixth photolithography step and an etching step are performed, so that a pixel electrode 601 is formed.

As described above, an active matrix substrate including the source wiring, the inverted staggered TFT 626 of the pixel portion 627, the storage capacitor 625, and the terminal can be manufactured by the six photolithography steps.

Then, a first orientation film 623 is formed over the active matrix substrate and rubbing treatment is performed. It is to be noted that before formation of the first orientation film 623, a columnar spacer 602 is formed at the desired position in order to keep a gap between the substrates by patterning an organic resin film such as an acrylic resin film in this embodiment. Alternatively, spherical spacers may be dispersed over the entire surface of the substrate instead of the columnar spacer.

Then, in accordance with Embodiment Mode 1, a second orientation film 640 overlapping with the terminal portion of the first orientation film 623 is formed.

Then, a counter substrate is prepared. This counter substrate is provided with a color filter 620 in which a colored layer and a light-blocking layer are arranged for each pixel. In addition, a planarizing film is provided to cover the color filter and the light-blocking layer. Then, a counter electrode 621 is formed on the planarizing film using a transparent conductive film. Then, a third orientation film 622 is formed on the entire surface of the counter substrate and rubbing treatment is performed thereto.

Next, a sealant is drawn so as to surround the pixel portion of the active matrix substrate. Liquid crystal is dripped to the region surrounded by the sealant 607 by a liquid crystal dispenser Then, the active matrix substrate and the counter substrate are attached to each other under reduced pressure with the sealant 607 to seal a liquid crystal layer 624.

Owing to the second orientation film 640, the speed of diffusion of the liquid crystal at the time of attachment is reduced, and a surface of the sealant is subjected to photo-curing during that time. Accordingly, unevenness of the inner periphery of the sealant is prevented, and further, impurities are prevented from seeping into the liquid crystal from the sealant which is not cured.

The sealant 607 is mixed with filler (not illustrated), so that two substrates can be attached to each other with a uniform gap therebetween by the filler and the spacer 602. By using a liquid crystal dripping method, the amount of liquid crystal used in the manufacturing process can be reduced, and particularly when a large-area substrate is used, the manufacturing cost can be drastically reduced.

Then, the active matrix substrate or the counter substrate is divided into a desired shape. In such a manner, the active matrix liquid crystal display device is completed.

Furthermore, optical films such as a polarizing plate 603 and a color filter are provided, as appropriate, using a known technique. Then, an FPC is attached using a known technique.

The liquid crystal module obtained through the above steps is provided with a backlight 604 and a light guiding plate 605 and covered with a cover 606, whereby the active matrix liquid crystal display device (transmissive type) is completed, a partial cross-sectional view of which is illustrated in FIG. 5. It is to be noted that the cover and the liquid crystal module are fixed to each other using an adhesive or an organic resin. In addition, since the liquid crystal display device is of transmissive type, the polarizing plate 603 is attached to each of the active matrix substrate and the counter substrate.

Further, an example of the transmissive type is described in this embodiment; however, the liquid crystal display device is not limited thereto, and a reflective or semi-transmissive liquid crystal display device can also be manufactured. In the case of obtaining a reflective liquid crystal display device, a metal film with high optical reflectance, typically, a film containing aluminum or silver as its main component, a stack thereof, or the like may be used for a pixel electrode. In the case of obtaining a semi-transmissive liquid crystal display device, one pixel electrode is formed using a transparent conductive film and a reflective metal film, so that a transmissive portion and a reflective portion are provided.

This embodiment can be freely combined with any one of Embodiment Modes 1 to 4.

Embodiment 2

Figure 6A:
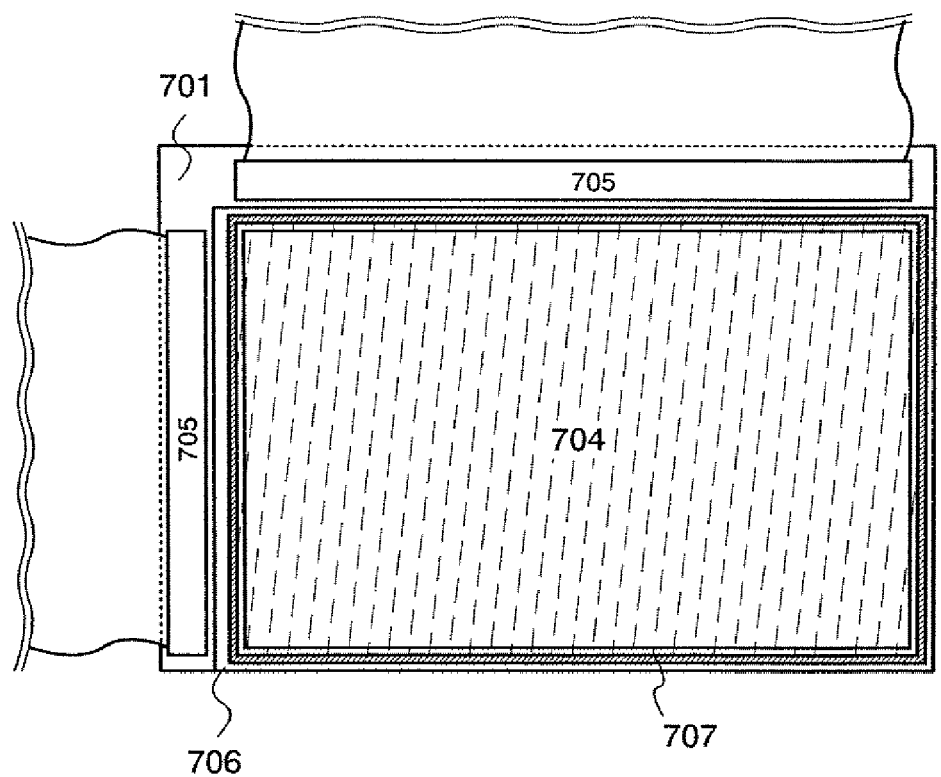
FIGS. 6A and 6B are top views of liquid crystal modules.
Figure 6B:
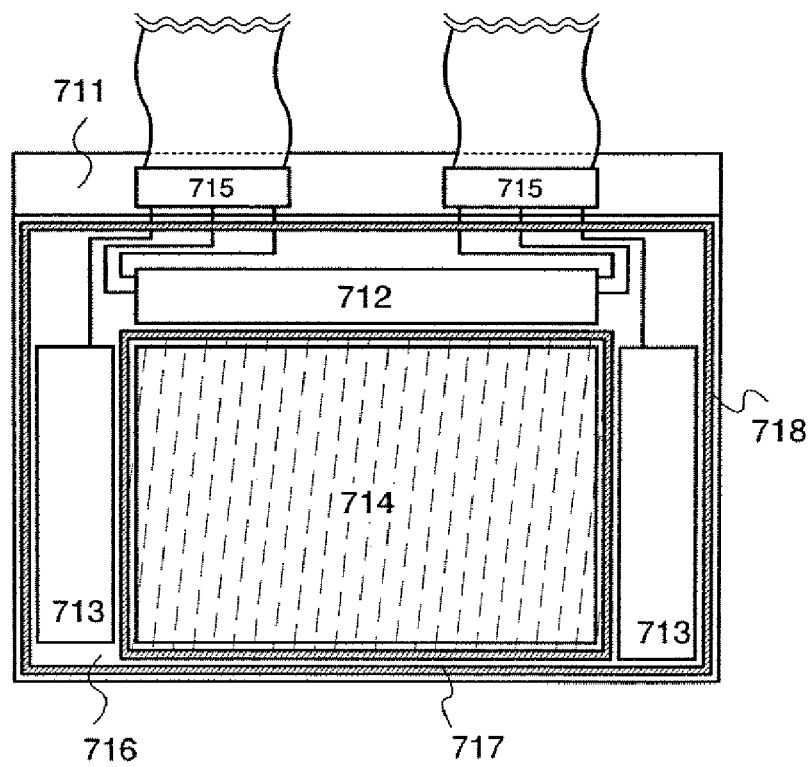

In this embodiment, a top view of the liquid crystal module described in Embodiment 1 is illustrated in FIG. 6A, and a top view of a liquid crystal module different from that of Embodiment 1 is illustrated in FIG. 6B.

The TFT whose active layer is formed using an amorphous semiconductor film described in Embodiment 1 has low field-effect mobility, which is approximately only about 1 cm$^2$/Vsec. Therefore, a driver circuit for performing image display is formed in an IC chip and mounted by a TAB (tape automated bonding) method or a COG (chip on glass) method.

In FIG. 6A, reference numeral 701 denotes an active matrix substrate; 706, a counter substrate; 704, a pixel portion; 707, a sealant; and 705, an FPC. It is to be noted that liquid crystal is dripped by a dispenser apparatus or an ink-jet apparatus under reduced pressure, and the pair of substrates 701 and 706 are attached to each other with the a sealant 707. Further, a region in which reduced is the speed of diffusion of the liquid crystal at the time of attaching the pair of substrates is provided between the sealant and the orientation film, and time until the liquid crystal is spread to come in contact with the sealant is lengthened. Thus, the sealant is subjected to photo-curing before the liquid crystal is in contact with the sealant. As described in Embodiment Mode 1 or Embodiment Mode 2, a region in which the speed of diffusion of the liquid crystal is reduced is formed using a material for forming a vertical orientation film, a silane coupling agent, a substance having a photocatalytic function, or the like.

The TFT according to Embodiment 1 has low field-effect mobility, but in the case of mass-production using large-area substrates, the cost for the manufacturing process can be reduced since the manufacturing process is carried out at low temperature. When the liquid crystal is dripped by a dispenser apparatus or an ink-jet apparatus under reduced pressure and a pair of substrates is attached to each other, the liquid crystal can be held between the pair of substrates regardless of their sizes, so that a display device provided with a liquid crystal panel having a large-sized screen of from 20 to 80 inches can be manufactured.

When an active layer is formed using a semiconductor film which is formed by crystallizing an amorphous semiconductor film to obtain a crystalline structure by a known crystallization treatment, typically, a polysilicon film, a TFT which has high field effect mobility can be obtained, and a driver circuit having a CMOS circuit can also be formed over the same substrate as the pixel portion. Further, in addition to the driver circuit, a CPU and the like can be manufactured over the same substrate as the pixel portion.

When a TFT having an active layer formed using a polysilicon film is used, a liquid crystal module as illustrated in FIG. 6B can be manufactured.

In FIG. 6B, reference numeral 711 denotes an active matrix substrate; 716, a counter substrate; 712, a source signal line driver circuit; 713, a gate signal line driver circuit; 714, a pixel portion; 717, a first sealant; and 715, an FPC. It is to be noted that liquid crystal is dripped by a dispenser apparatus or an inkjet apparatus under reduced pressure, and the pair of substrates 711 and 716 is attached to each other with the first sealant 717 and a second sealant 718. Since the liquid crystal is not necessary for the driver circuit portions 712 and 713, the liquid crystal is held only in the pixel portion 714, and the second sealant 718 is provided for reinforcement of the whole panel.

This embodiment can be freely combined with Embodiment Mode 1, 2, 3, or 4, or Embodiment 1.

Embodiment 3

Electronic devices can be manufactured by incorporating the liquid crystal display device obtained according to the present invention into a display portion. Examples of the electronic devices are as follows: cameras such as video cameras or digital cameras, goggle type displays (head mounted displays), navigation systems, sound reproduction devices (car audios, audio components, or the like), laptop computers, game machines, mobile information terminals (mobile computers, mobile telephones, mobile game machines, electronic books, or the like), image reproduction devices equipped with recording media (specifically, a device which reproduces the recording medium such as a digital versatile disc (DVD)) and which is equipped with a display for displaying the image), and the like. Specific examples of those electronic devices are illustrated in FIGS. 7A to 7H.

Figure 7A:
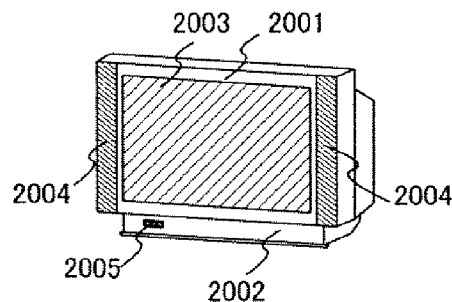
FIGS. 7A to 7H illustrate examples of an electronic device.

FIG. 7A illustrates a television which includes a casing 2001, a supporting base 2002, a display portion 2003, speaker units 2004, a video input terminal 2005, and the like. The present invention can be applied to the display portion 2003. It is to be noted that the term "television" includes every television for displaying information such as one for a personal computer, one for receiving TV broadcasting, and one for advertising.

Figure 7B:
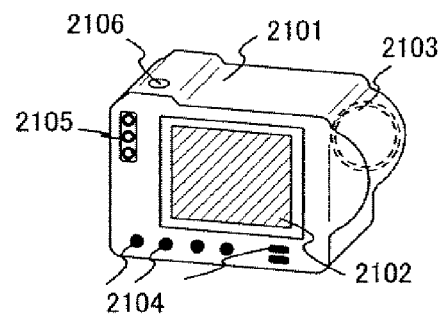

FIG. 7B illustrates a digital camera which includes a main body 2101, a display portion 2102, an image receiving unit 2103, operation keys 2104, an external connection port 2105, a shutter button 2106, and the like. The present invention can be applied to the display portion 2102.

Figure 7C:
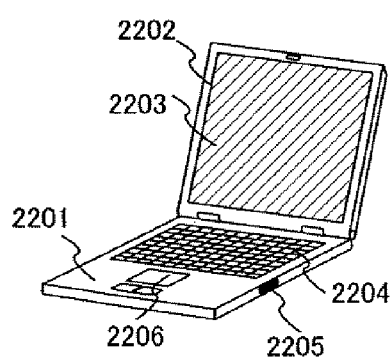

FIG. 7C illustrates a laptop personal computer which includes a main body 2201, a casing 2202, a display portion 2203, a keyboard 2204, an external connection port 2205, a pointing device 2206, and the like. The present invention can be applied to the display portion 2203.

Figure 7D:
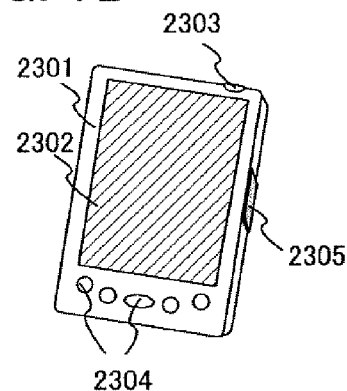

FIG. 7D illustrates a mobile computer which includes a main body 2301, a display portion 2302, a switch 2303, operation keys 2304, an infrared ray port 2305, and the like. The present invention can be applied to the display portion 2302.

Figure 7E:
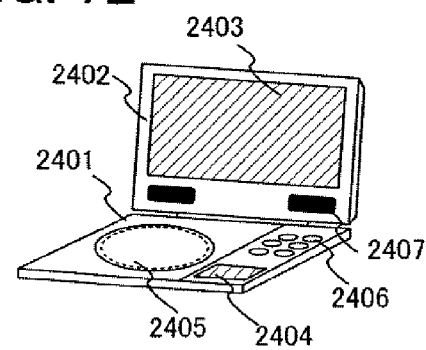

FIG. 7E illustrates a portable image reproducing device equipped with a recording medium (specifically, a DVD player). The device includes a main body 2401, a casing 2402, a display portion A 2403, a display portion B 2404, a recording medium (such as DVD) reading unit 2405, operation keys 2406, speaker units 2407, and the like. The display portion A 2403 mainly displays image information whereas the display portion B 2404 mainly displays text information. The present invention can be applied to the display portions A 2403 and B 2404. It is to be noted that the term "image reproducing device equipped with a recording medium" includes home-use game machines and the like.

Figure 7F:
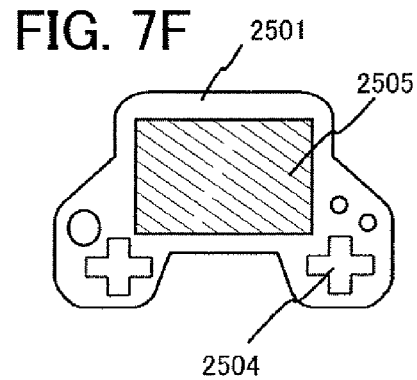

FIG. 7F illustrates a game machine which includes a main body 2501, a display portion 2502, operation switches 2504, and the like.

FIG. 76 illustrates a video camera which includes a main body 2601, a display portion 2602, a casing 2603, an external connection port 2604, a remote control receiving unit 2605, an image receiving unit 2606, a battery 2607, an audio input unit 2608, operation keys 2609, and the like. The present invention can be applied to the display portion 2602.

Figure 7G:
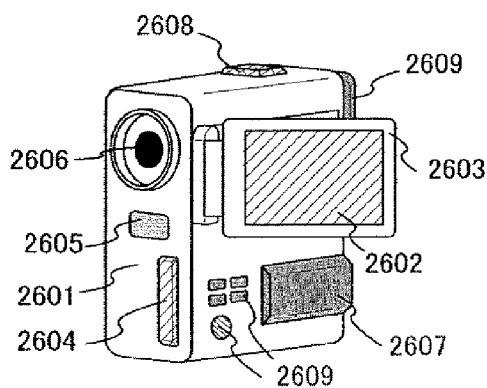
Figure 7H:
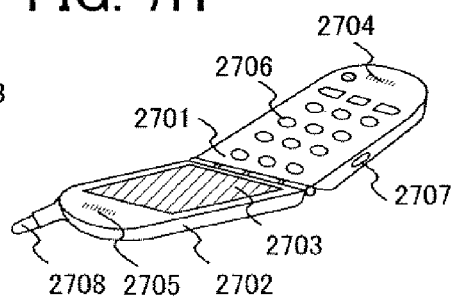

FIG. 7H illustrates a mobile phone which includes a main body 2701, a casing 2702, a display portion 2703, an audio input unit 2704, an audio output unit 2705, operation keys 2706, an external connection port 2707, an antenna 2708, and the like. The present invention can be applied to the display portion 2703.

As described above, the display device obtained by implementing the present invention may be used as the display portions of various electronic devices. The electronic devices of this embodiment may be manufactured using a liquid crystal display device which uses any structures of Embodiment Modes 1 to 4, and Embodiments 1 and 2.

When substrates are attached under reduced pressure which is suitable for taking multiple panels, a liquid crystal display device can be produced in which usability of a liquid crystal material is high and unevenness in the inner periphery of a seal is prevented.

This application is based on Japanese Patent Application serial no. 2007-167346 filed with Japan Patent Office on Jun. 26, 2007, the entire contents of which are hereby incorporated by reference.

What is claimed is:

1. A method for manufacturing a liquid crystal display device, comprising the steps of:
    forming a first orientation film over a first substrate;
    forming a second orientation film surrounding the first orientation film over the first substrate;
    forming a sealant surrounding the first orientation film and the second orientation film over the first substrate, the sealant surrounding the first orientation film with the second orientation film interposed therebetween;
    dripping a liquid crystal to the first orientation film;
    attaching a second substrate to the first substrate with the liquid crystal interposed therebetween; and
    curing the sealant.

2. The method for manufacturing a liquid crystal display device according to claim 1,
    wherein the second orientation film is a vertical orientation film.

3. The method for manufacturing a liquid crystal display device according to claim 1,
    wherein the step of attaching the second substrate to the first substrate is performed under reduced pressure.

4. The method for manufacturing a liquid crystal display device according to claim 1,
    wherein the step of attaching the second substrate to the first substrate is performed to allow the sealant to overlap with the second orientation film.

5. The method for manufacturing a liquid crystal display device according to claim 1, further comprising the steps of:
    forming a third orientation film over the second substrate; and
    forming a fourth orientation film surrounding the third orientation film over the second substrate,
    wherein the step of attaching the second substrate to the first substrate is performed to allow the liquid crystal to be interposed between the first orientation film and the third orientation film.

6. The method for manufacturing a liquid crystal display device according to claim 5,
    wherein the step of attaching the second substrate to the first substrate is performed to allow the sealant to overlap with the second orientation film and the fourth orientation film.

7. The method for manufacturing a liquid crystal display device according to claim 1, further comprising the step of forming a pixel region including a plurality of pixels,
    wherein the pixel region is covered with the first orientation film.

8. The method for manufacturing a liquid crystal display device according to claim 1, further comprising the step of forming a pixel region including a plurality of pixels,
    wherein an area of the first orientation film is larger than an area of the pixel region.

9. The method for manufacturing a liquid crystal display device according to claim 1, further comprising the step of forming a pixel region including a plurality of pixels,
    wherein the second orientation film is formed outside the pixel region.

10. The method for manufacturing a liquid crystal display device according to claim 1, wherein the second orientation film is formed so as to surround side surfaces of the first orientation film.

11. The method for manufacturing a liquid crystal display device according to claim 1, wherein the second substrate is attached to the first substrate with the liquid crystal interposed therebetween before curing the sealant.

* * * * *

UNITED STATES PATENT AND TRADEMARK OFFICE
CERTIFICATE OF CORRECTION

| | |
|---|---|
| PATENT NO. | : 8,049,851 B2 |
| APPLICATION NO. | : 12/143032 |
| DATED | : November 1, 2011 |
| INVENTOR(S) | : Masahide Kanai et al. |

Page 1 of 1

It is certified that error appears in the above-identified patent and that said Letters Patent is hereby corrected as shown below:

In the Specification:

Column 2, line 52, "a scaling material" should read "a sealing material"

Column 3, line 54, "an inkjet method" should read "an ink-jet method"

Column 7, line 1, "the Liquid" should read "the liquid"

Column 9, line 10, "an ink-Jet method" should read "an ink-jet method"

Column 11, line 29, "an ink-Jet method" should read "an ink-jet method"

Column 13, line 28, "poly(3,4-tethylenedioxythiophene)" should read "poly(3,4-ethylenedioxythiophene)"

Column 13, lines 60-61, "As shown in FIG. 39" should read "As shown in FIG. 3D"

Column 15, line 22, "As shown in FIG. 41" should read "As shown in FIG. 4B"

Column 19, line 57, "an RE sputtering method" should be "an RF sputtering method"

Column 22, line 25, "inkjet apparatus" should read "ink-jet apparatus"

Column 23, line 23, "FIG. 76 illustrates" should read "FIG. 7G illustrates"

Signed and Sealed this
Twentieth Day of March, 2012

David J. Kappos
*Director of the United States Patent and Trademark Office*